Oct. 9, 1945.  R. J. WHITE  2,386,176
GYROSCOPIC APPARATUS
Filed July 19, 1943  2 Sheets-Sheet 1

Inventor
Robert J. White
By Benjamin F. Wupper
Atty.

Oct. 9, 1945.                R. J. WHITE                2,386,176
                          GYROSCOPIC APPARATUS
                    Filed July 19, 1943        2 Sheets-Sheet 2
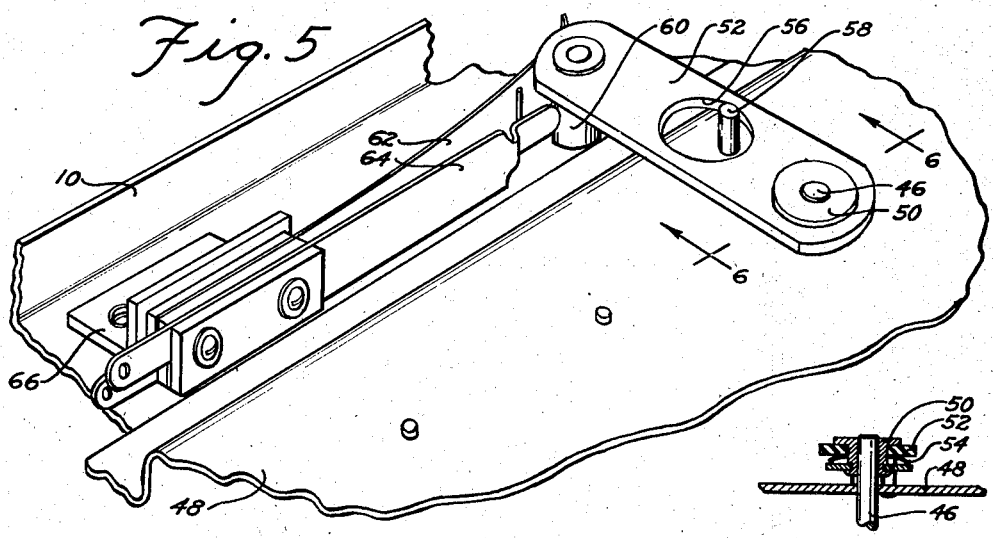
Fig. 5
Fig. 6
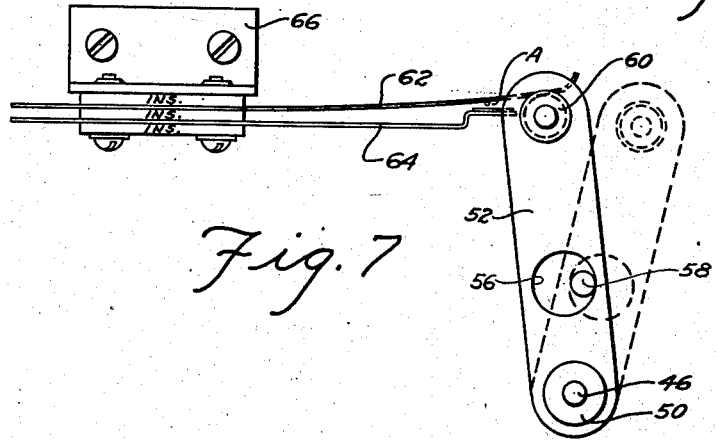
Fig. 7
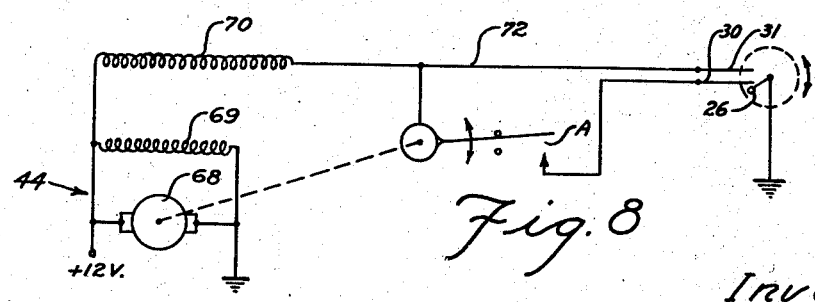
Fig. 8
Inventor
Robert J. White
By Benjamin F. Nupper
        Atty.

Patented Oct. 9, 1945

2,386,176

UNITED STATES PATENT OFFICE 2,386,176

GYROSCOPIC APPARATUS

Robert J. White, Chicago, Ill., assignor to Hammond Instrument Company, Chicago, Ill., a corporation of Delaware Application July 19, 1943, Serial No. 495,313

3 Claims. (Cl. 74—5)

My invention relates generally to gyroscopic apparatus and more particularly to an improved erection mechanism for gyroscopes.

The invention is particularly applicable to gyroscopes of the type shown in the application of Laurens Hammond, Serial No. 463,643, filed October 28, 1942, and has for its primary object the provision of an improved motor control circuit and apparatus for causing automatic erection of the gyro.

A further object is to provide an improved gyro erecting mechanism and control circuits therefor.

Other objects will appear from the following description in which:

Figure 5 is a bottom perspective view of the motor reversing switch mechanism;

Figure 6 is a fragmentary sectional view taken on the line 6—6 of Fig. 5;

Figure 7 is a bottom plan view of the switch mechanism shown in Fig. 5; and

Figure 8 is a wiring diagram showing the motor control circuit.

Figure 1:
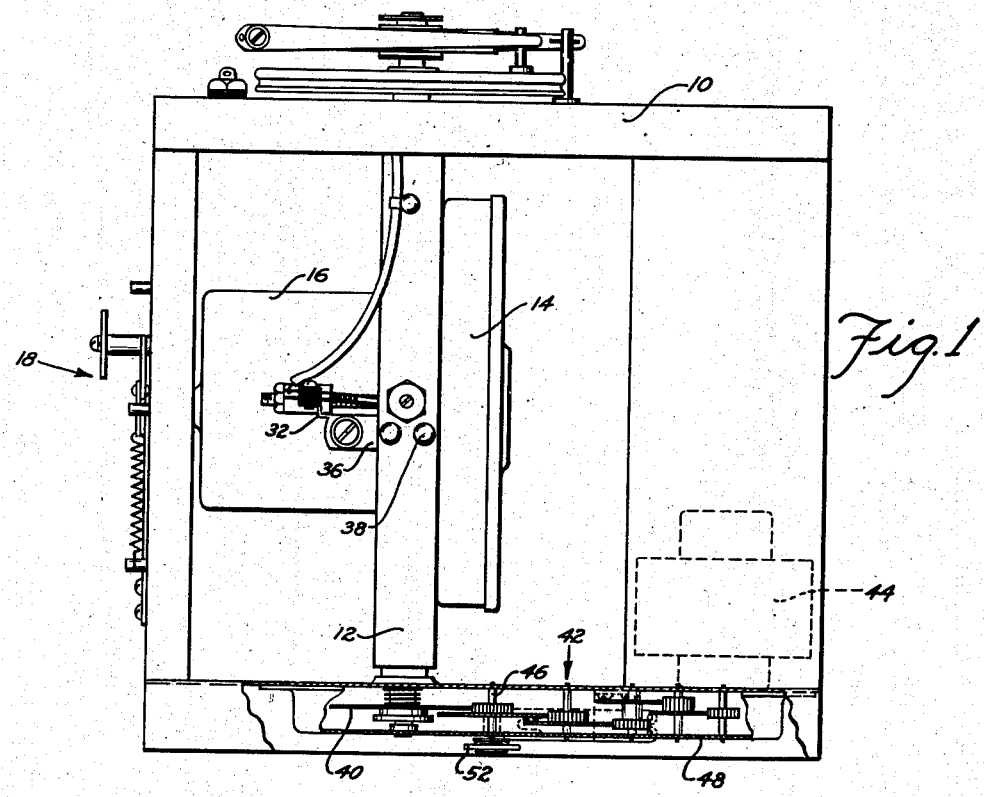
Figure 1 is a side elevational view of a gyro mechanism, portions of the casing being broken away to show the gyro erecting gear train.

Referring to Fig. 1 the gyro mechanism is mounted in a suitable supporting frame 10 having a gimbal 12, mounted for rotation about a vertical axis, and a gyro case 14 suitably mounted for rotation about a horizontal axis in the gimbal 12. An electric motor case 16 may be attached to the gyro case 14 and has its rotor normally on a horizontal axis as shown in Fig. 1, the motor case 16 and gyro case being adapted to be held in the position shown by any suitable caging mechanism such as the mechanism indicated generally by the reference character 18 in Fig. 1.

Figure 2:
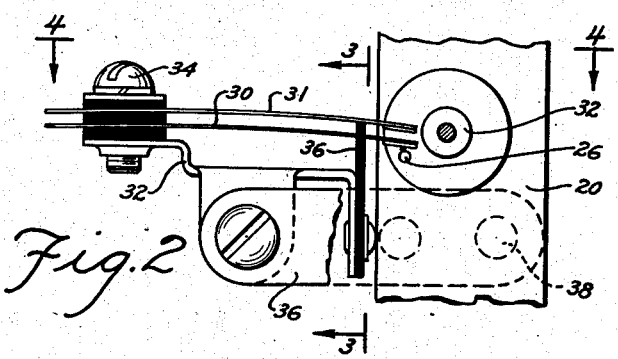
Figure 2 is a fragmentary sectional view on an enlarged scale showing the gyro controlled switch.
Figure 3:
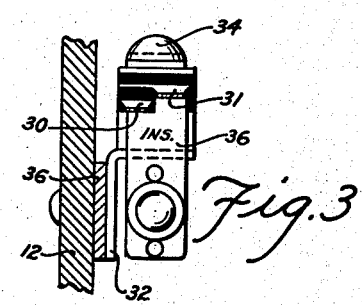
Figure 3 is a sectional view taken on the line 3—3 of Fig. 2.
Figure 4:
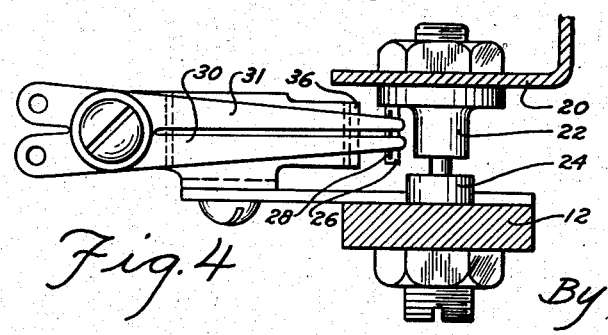
Figure 4 is a horizontal sectional view taken on the line 4—4 of Fig. 2.

Referring to Figs. 2, 3 and 4, the gyro case 14 has a frame part 20 to which a pivot stud 22 is rigidly secured, the stud 22 projecting into a suitable bearing 24 secured in the gimbal 12. The stud 22 has a pin 26 projecting therefrom, the pin having a non-corroding contact wire 28 welded thereto for cooperation with contact wires respectively welded on switch arms 30 and 31. The switch arms 30 and 31 are suitably insulated from each other and from a bracket 32, to which they are clamped by a screw 34. The bracket 32 also carries an insulating stepped stop 36 against which the contact arms 30 and 31 are resiliently biased. The bracket 32 is rigidly secured to a supporting arm 36 which may be secured to the gimbal 12 in any suitable manner, as by rivets 38.

The vertical gimbal 12 is provided with suitable bearings and is adapted to be frictional and resiliently rotated about a vertical axis by means of gear 40 which is frictionally and resiliently connected to the gimbal pivot stud. The gear 40 is adapted to be driven through a suitable speed reducing gear train 42 by means of a reversible motor 44. One of the shafts 46 of the gear train, to which one of the gear and pinion assemblies is rigidly secured, projects through the lower plate of a gear train housing 48, and has a bushing 50 (Fig. 6) rigidly secured to the projecting end. An arm 52 is rotatably mounted on the bushing 50 but is frictionally constrained to move therewith by virtue of being pressed against the flange of the bushing 50 by a spring washer 54. The arm 52 is preferably of insulating material such as a laminated phenolic condensation product and has an opening 56 formed therein surrounding a stop pin 58. The extent of pivotal movement of the arm 52 is thus limited by the stop pin 58 which is rigidly secured to, and projects downwardly from the casing 48.

An insulating roller 60 is secured to the free end of the arm 52 and, as best shown in Fig. 7, is adapted to engage the projecting end of a spring contact arm 62, this arm being cooperable with a relatively rigid contact arm 64, both arms 62 and 64 being rigidly clamped to a mounting bracket 66 secured to the frame 10 of the gyro, the switch arms 62 and 64 being suitably insulated from each other and from the bracket 66. The arm 52 when in full line position (Fig. 7) opens the switch A formed by the switch contact arm 62 and 64 but when it is swung to the dotted line position permits flexure of the switch arm 62 to close the switch A. It will be understood that when the motor 44 is rotating in one direction it will, due to the frictional connection between the arm 52 and the shaft 46, swing this arm to the full line position, while when the motor reverses its direction of rotation it will swing this arm to its dotted line position.

In the wiring diagram, Fig. 8, the motor 44 is illustrated as of the shunt wound direct current type, having a rotatable armature 68 and two field windings 69 and 70. The field winding 69 has approximately half as many turns as the winding 70, and the windings are opposed. Thus when only the winding 69 is energized the motor will rotate in one direction while when both windings 69 and 70 are energized the motor will rotate in the reverse direction.

It will be noted from Figs. 1, 2 and 3 that as the gyro precesses clockwise the pin 26, which is grounded to the frame 10, first contacts the switch arm 30, and after an additional movement through an angle in the order of 12 degrees, engages contact arm 31. Upon counter-clockwise precession of the gyro the contact pin 26 breaks contact first with the contact arm 31 and then with the contact arm 30.

As shown in Fig. 8 the upper contact arm 31 is connected by a conductor 72 with the winding 70, while the lower contact arm 30 is connected through the switch A with the conductor 72.

In describing the operation of the apparatus it will be assumed that the gyro has commenced clockwise (Fig. 1) precession, (due to the application of a torque to the gimbal, either because of rotation of the frame about a vertical axis or because of the rotation of the motor 44) and that the switch A is open. Such clockwise precession will cause engagement of the contact pin 26 with the switch arm 30 but, since the switch A is open, this engagement of the switch arm 30 will not have any effect. Continued clockwise precession of the gyro will cause the contact pin 26 to engage the contact arm 31, resulting in the completion of a circuit from the +12 v. terminal of the power supply (such as a battery) through the winding 70, conductor 72, switch arm 31, contact pin 26 to the grounded terminal of the power source. Under these circumstances both of the windings 69 and 70 will be energized and hence the motor 44 will reverse its direction of rotation. Such reversal will cause the arm 52 to be frictionally driven clockwise, resulting in closure of the switch A. Such rotation of the motor 44 in the reverse direction will, by applying a torque to the gimbal 12 in the proper direction, cause precession of the gyro in a counter-clockwise direction.

Thus the contact pin 26 will move away from the switch arm 31, but the circuit through the winding 70 will still be completed through the switch A, and lower contact arm 30 and contact pin 26, and therefore the counter-clockwise precession will continue. When, upon such continued counter-clockwise precession, the contact pin 26 moves away from the switch arm 30, the energizing circuit for the winding 70 will be broken and the motor 44 will again reverse its direction and apply a torque to the gimbal 12 in a direction to produce clockwise precession of the gyro. Immediately upon this second reversal of direction of rotation of the motor 44, the arm 52 will be swung to its full line position (Fig. 7) thereby opening the switch A and completing one cycle of operation.

By virtue of the spacing of the switch arms 30 and 31 the precessional oscillation of the gyro casing will take place through a small angle in the order of 12°. Such oscillation takes place continuously while the apparatus is in operation. The period of such oscillation may be in the order of 10 to 15 seconds, depending upon the particular use to which the apparatus is being put.

Since the angle through which the gyro casing may oscillate is accurately determined by the operation of the switches 30, 31 the effect of a substantially frictionless bearing for the vertical gimbal 12 is obtained.

It will be noted that the circuit for control of the motor 44 is a simple circuit not involving the use of a relay, thus improving the reliability and durability of the apparatus and making it possible to manufacture the apparatus at a lower cost than if relays were utilized.

While I have shown a particular embodiment of my invention, it will be understood by those skilled in the art that it is capable of embodiment in various modified forms. I therefore desire by the accompanying claims to include within the scope of my invention all such variations and modifications by which substantially the results of the invention may be obtained through the use of substantially the same or equivalent means.

I claim:

1. In a gyroscope erecting apparatus the combination of a gyro case, a gimbal for supporting said case, a reversible motor having direct and reversing field windings, a frictional driving connection between said motor and said gimbal, a first switch, a switch actuator operatively associated with said driving connection to open said first switch promptly upon commencement of rotation of said motor in one direction and to close said first switch promptly upon commencement of rotation of said motor in the opposite direction, a pair of contact switches successively closed by precession of said gyro case in one direction and successively opened in reverse order upon precession of said gyro in the opposite direction, and parallel circuits capable of energizing said reversing winding, one of said parallel circuits including said first switch and the first closed contact switch in series, and the other of said circuits including said second closed contact switch.

2. In an erecting mechanism for gyroscopes, the combination of a reversible electric motor, a vertical axis gimbal, a gyro case mounted for rotary movement in said gimbal on a horizontal axis, a driving connection between said motor and said gimbal, means normally energizing said motor to cause rotation in one direction, a pair of circuits in parallel either of which when completed causes rotation of said motor in a reverse direction, a pair of switches successively closed upon precession of said gyro case in one direction and successively opened in reverse order upon precession of said gyro case in the opposite direction, there being one of said switches in each of said parallel circuits, an additional switch in one of said circuits, and means opening and closing said additional switch in response to the direction of rotation of said motor.

3. In an erecting apparatus for gyroscopes, the combination of a gyro case, a gimbal supporting said case for rotary movement on a horizontal axis, means for mounting said gimbal for rotary movement on a vertical axis, a motor having a continuously energized direct winding and a reversing winding opposed to said direct winding and being approximately twice as effective as said direct winding, and switch means responsive both to the direction of precession of said gyro case and to the direction of rotation of said motor and operative to complete energizing circuits of said reversing winding whenever said gyro precesses through a predetermined angle from its normal position in one direction and during the time that precession takes place in the opposite direction.

ROBERT J. WHITE.